(12) United States Patent
Helmick et al.

(10) Patent No.: US 10,339,343 B2
(45) Date of Patent: Jul. 2, 2019

(54) STORAGE SYSTEM AND METHOD FOR IMPROVED GENERATION AND STORAGE OF DATA PROTECTION INFORMATION

(71) Applicant: Western Digital Technologies, Inc., Irvine, CA (US)

(72) Inventors: Daniel Helmick, Broomfield, CO (US); Majid Nemati Anaraki, San Diego, CA (US); Mai Ghaly, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/631,293

(22) Filed: Jun. 23, 2017

(65) Prior Publication Data
US 2018/0349645 A1    Dec. 6, 2018

Related U.S. Application Data

(60) Provisional application No. 62/515,911, filed on Jun. 6, 2017.

(51) Int. Cl.
| | | |
|---|---|---|
| *H03M 13/00* | (2006.01) | |
| *G06F 21/64* | (2013.01) | |
| *G06F 21/60* | (2013.01) | |
| *G11B 20/18* | (2006.01) | |
| *G06F 21/62* | (2013.01) | |

(52) U.S. Cl.
CPC .............. *G06F 21/64* (2013.01); *G06F 21/60* (2013.01); *G11B 20/1833* (2013.01); *G06F 21/6227* (2013.01); *G11B 20/18* (2013.01)

(58) Field of Classification Search
CPC ...... G06F 21/64; G06F 21/60; G06F 21/6227; G11B 20/18
See application file for complete search history.

(56) References Cited

U.S. PATENT DOCUMENTS

| | | | | |
|---|---|---|---|---|
| 8,719,664 B1 * | 5/2014 | Chan | ................... | G06F 11/1076 711/103 |
| 2013/0139030 A1 * | 5/2013 | Okubo | ................ | G06F 11/1048 714/755 |
| 2013/0219244 A1 * | 8/2013 | Kato | ................... | G06F 11/1048 714/763 |
| 2015/0309886 A1 * | 10/2015 | Tsai | .................... | G06F 11/1469 714/19 |

(Continued)

OTHER PUBLICATIONS

Application as Filed in U.S. Appl. No. 15/297,953, entitled, "Media Controller and Method for Management of CPU-Attached Non-Volatile Memory", filed on Oct. 19, 2016, 56 pages.

(Continued)

*Primary Examiner* — Samir W Rizk
(74) *Attorney, Agent, or Firm* — Dickinson Wright PLLC

(57) ABSTRACT

A storage system is provided comprising a memory and a controller. The controller is configured to receive a write command, data, and a logical address; determine a physical address associated with the logical address; generate protection information for the data using the data and at least one of the logical address and physical address; and store the data and the protection information in the memory without storing the at least one of the logical address and physical address in the memory.

20 Claims, 13 Drawing Sheets

(56) References Cited

U.S. PATENT DOCUMENTS

2016/0132240 A1    5/2016  Berke et al.

OTHER PUBLICATIONS

Application as Filed in U.S. Appl. No. 15/297,971, entitled, "Electrically-Buffered NV-DIMM and Method for Use Therewith", filed on Oct. 19, 2016, 86 pages.
Application as Filed in U.S. Appl. No. 15/297,982, entitled, "Storage System with Integrated Components and Method for Use Therewith", filed on Oct. 19, 2016, 111 pages.
Application as Filed in U.S. Appl. No. 15/297,993, entitled, "Storage System with Several Integrated Components and Method for Use Therewith", filed on Oct. 19, 2016, 114 pages.
Application as Filed in U.S. Appl. No. 15/298,025, entitled, "Media Controller with Response Buffer for Improved Data Bus Transmissions and for Use Therewith", filed on Oct. 19, 2016, 98 pages.
Application as Filed in U.S. Appl. No. 15/628,361, entitled, "Storage System with a Controller Having a Persistent Memory Interface to Local Memory", filed on Jun. 20, 2017, 43 pages.

* cited by examiner

STORAGE SYSTEM AND METHOD FOR IMPROVED GENERATION AND STORAGE OF DATA PROTECTION INFORMATION

CROSS-REFERENCE TO RELATED APPLICATION

This application claims priority to U.S. Provisional Patent Application No. 62/515,911, filed Jun. 6, 2017, which is hereby incorporated by reference.

BACKGROUND

Some storage systems use data protection information, such as an error correction code and/or an error detection code, to protect data from errors that can occur when the data is stored in the memory of the storage system. In operation, a host sends data and a logical address to the storage system, and, in response, the storage system generates the protection information for the data and stores the data in a physical address in memory that is mapped to the logical address. In some storage systems, in addition to storing the data and the protection information, the storage system also stores the logical address, as the logical address can be used to debug the logical-to-physical address map, if an error occurs that makes one or more entries in the map out of date.

DETAILED DESCRIPTION

Overview

Figure 1A:
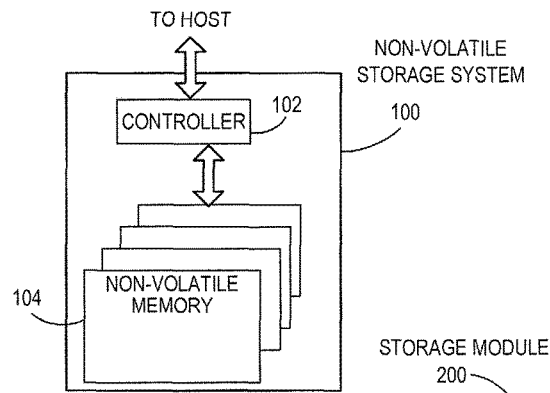
FIG. 1A is a block diagram of a non-volatile storage system of an embodiment.

By way of introduction, the below embodiments relate to a storage system and method for improved generation and storage of data protection information. In one embodiment, a storage system is provided comprising a memory and a controller. The controller is configured to receive a write command, data, and a logical address; determine a physical address associated with the logical address; generate protection information for the data using the data and at least one of the logical address and physical address; and store the data and the protection information in the memory without storing the at least one of the logical address and physical address in the memory.

In some embodiments, the protection information comprises at least one of an error detection code and an error correction code.

In some embodiments, the protection information comprises both an error detection code and an error correction code, and the controller is configured to: generate the error detection code using the data and the at least one of the logical address and physical address; and generate the error correction code using the data, the at least one of the logical address and physical address, and the error detection code.

In some embodiments, the protection information comprises both an error detection code and an error correction code, and the controller is configured to: generate the error detection code using the data and the at least one of the logical address and physical address; and generate the error correction code using the data and the error detection code but not the at least one of the logical address and physical address.

In some embodiments, the controller is further configured to: receive a read command and the logical address; determine the physical address associated with the logical address; read the data and the protection information from the physical address in the memory; and process the protection information.

In some embodiments, the controller is further configured to generate new protection information and store the data and the new protection information in the memory in response to the storage system moving the data from the physical address to a new physical address.

In some embodiments, the controller is further configured to map logical addresses to physical addresses such that each logical address maps to a single physical address and each physical address maps to a single logical address.

In some embodiments, the controller is further configured to map logical addresses to physical addresses, wherein an accuracy of the mapping is above a threshold.

In some embodiments, the memory comprises a three-dimensional memory.

In some embodiments, the storage system is embedded in the host.

In some embodiments, the storage system is removably connected to the host.

In another embodiment, a method is provided for writing a code word to memory. The method comprises creating error detection code using data and at least one of a logical address and a physical address associated with the logical address; creating error correction code using the data and the error detection code; and writing a code word comprising the data, error detection code, and error correction code in a memory, wherein the code word is free of the at least one of the logical address and physical address.

In some embodiments, the error correction code comprises systematic error correction code, and wherein the error correction code is further generated using the at least one of the logical address and physical address.

In some embodiments, the error correction code comprises non-systematic error correction code, and wherein the error correction code is generated without using at least one of the logical address and physical address.

In some embodiments, the storage system comprises a controller configured to map logical addresses to physical addresses, wherein an accuracy of the mapping is above a threshold.

In some embodiments, the memory comprises a three-dimensional memory.

In some embodiments, the storage system is embedded in a host.

In some embodiments, the storage system is removably connected to a host.

In another embodiment, a storage system is provided comprising a memory; means for receiving a write command, data, and a logical address; means for generating protection information for the data; and means for storing the data and the protection information in the memory without storing the logical address.

In some embodiments, the memory comprises a three-dimensional memory.

Other embodiments are possible, and each of the embodiments can be used alone or together in combination. Accordingly, various embodiments will now be described with reference to the attached drawings.

Embodiments

Figure 1B:
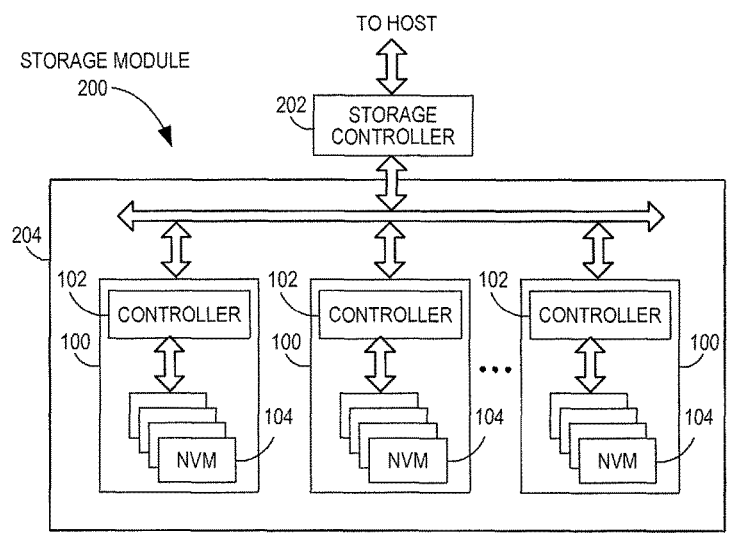
FIG. 1B is a block diagram illustrating a storage module of an embodiment.
Figure 1C:
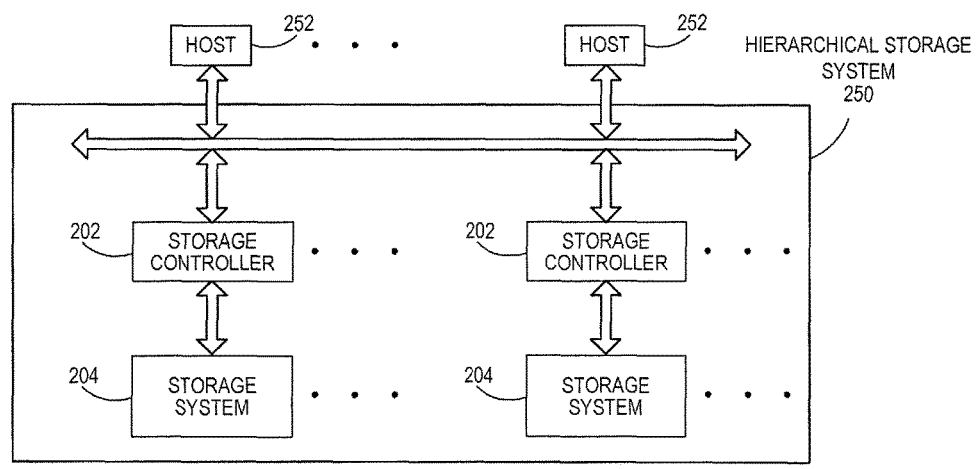
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. It should be noted that while "die" and "Flash" are used in this example, these embodiments can be used with any suitable type of memory, such as, but not limited to, NAND (e.g., 3D and 2D). persistent memories (e.g., ReRam, PCM, OxRAM, MRAM), hard disk drives (HDD), optical storage, and magnetic (tape) storage). Controller 102 interfaces with a host system and transmits command sequences for read, program, and erase operations to non-volatile memory die 104.

The controller 102 (which may be a flash memory controller, but, as noted above, the memory does not need to be flash) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. For example, hardware can refer to circuits, logic, and transistor gates to service some function in a larger system. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it can communicate with the flash memory controller. If the host provides a logical address to which data is to be read/written, the flash memory controller can convert the logical address received from the host to a physical address in the flash memory. (Alternatively, the host can provide the physical address.) As noted above, the memory does not need to be flash, so the "flash memory controller" will often be referred to herein as "memory controller" or just "controller." A memory controller can also perform various memory management functions, such as, but not limited to, wear leveling (distributing writes to avoid wearing out specific blocks of memory that would otherwise be repeatedly written to in persistent ("program in place") media (e.g., PCM, OxRAM, ReRAM, MRAM, NOR)) and garbage collection (after a block is full, moving only the valid pages of data to a new block, so the full block can be erased and reused in flash or block-accessible storage media). Also, as noted above, when "memory die" is used in this example, any type of memory can be used. Accordingly, the specifics of the wear leveling algorithm and other details discussed herein can alter depending on the exact type of memory used. For example, when the memory takes the form of a hard drive, tape drive, or optical drive, a head positioning algorithm can be used. Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cells (QLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800; ONFI (open NAND Flash interface); and DDR DRAM.

In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some NAND storage system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interface express (PCIe) interface, or SD and microSD interfaces. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
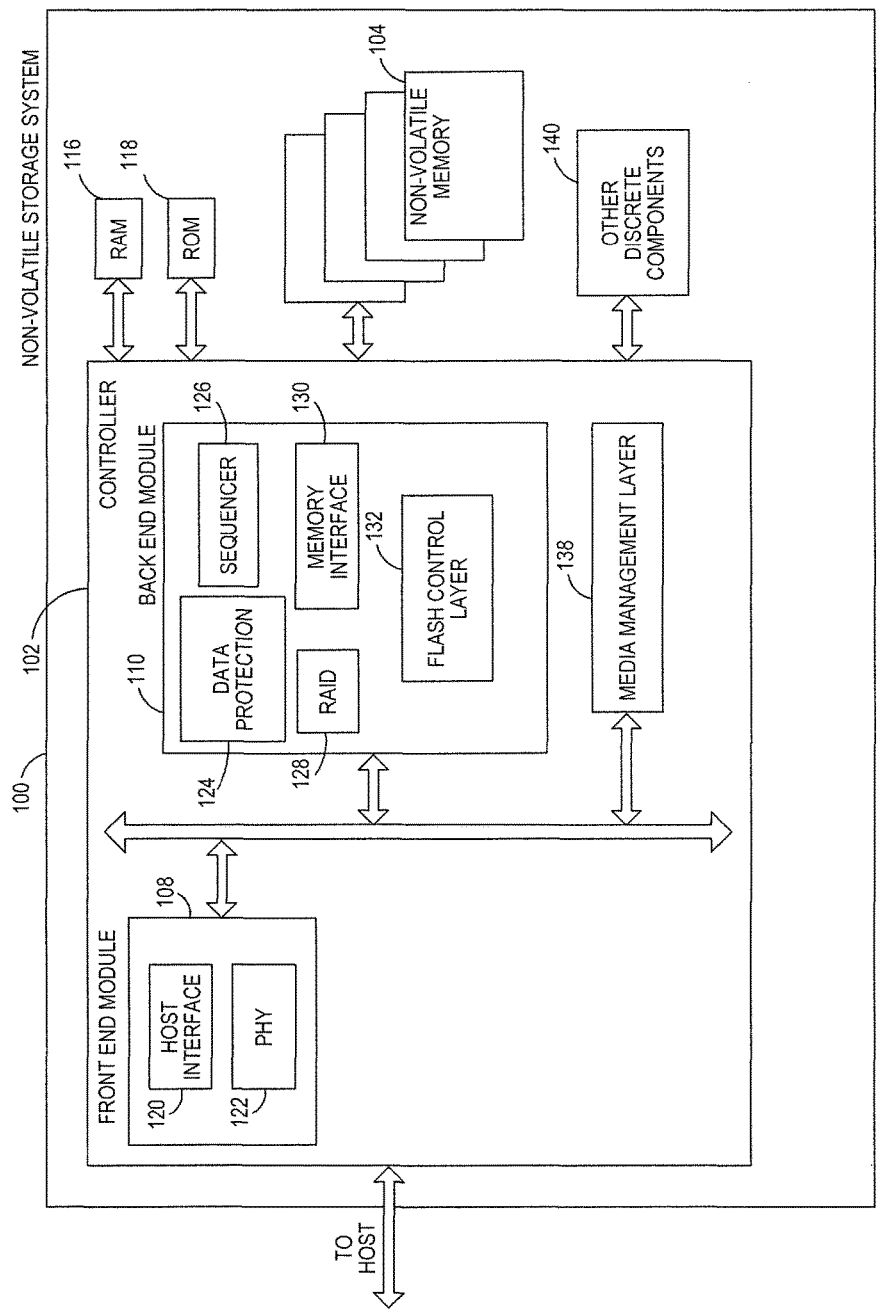
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules can be implemented in hardware or software/firmware.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes a data protection module 110, which can generate and process data protection information, such as error detection codes and error correction codes. For example, in one embodiment, the controller 102 comprises an error correction code (ECC) engine that encodes the data bytes received from the host, and decodes and error corrects the data bytes read from the non-volatile memory. Any suitable type of EDC or ECC can be used. For example, a cyclical redundancy check (CRC) can be used for EDC. In a system that stores a logical address with the data, an EDC check can examine the logical address for correctness and matching the expected logical address value. More generally, this involves storing a known value in a known position with the data and checking the known value on decode. Examples of ECC include, but are not limited to, BCH, RS, and XOR, and LDPC.

A command sequencer (or scheduler) 126 generates command sequences, such as read, program and erase command sequences, to be transmitted to the non-volatile memory 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102. The media management layer 138 can operations, such as, but not limited to, wear leveling, garbage collection, and degradation management.

Figure 2B:
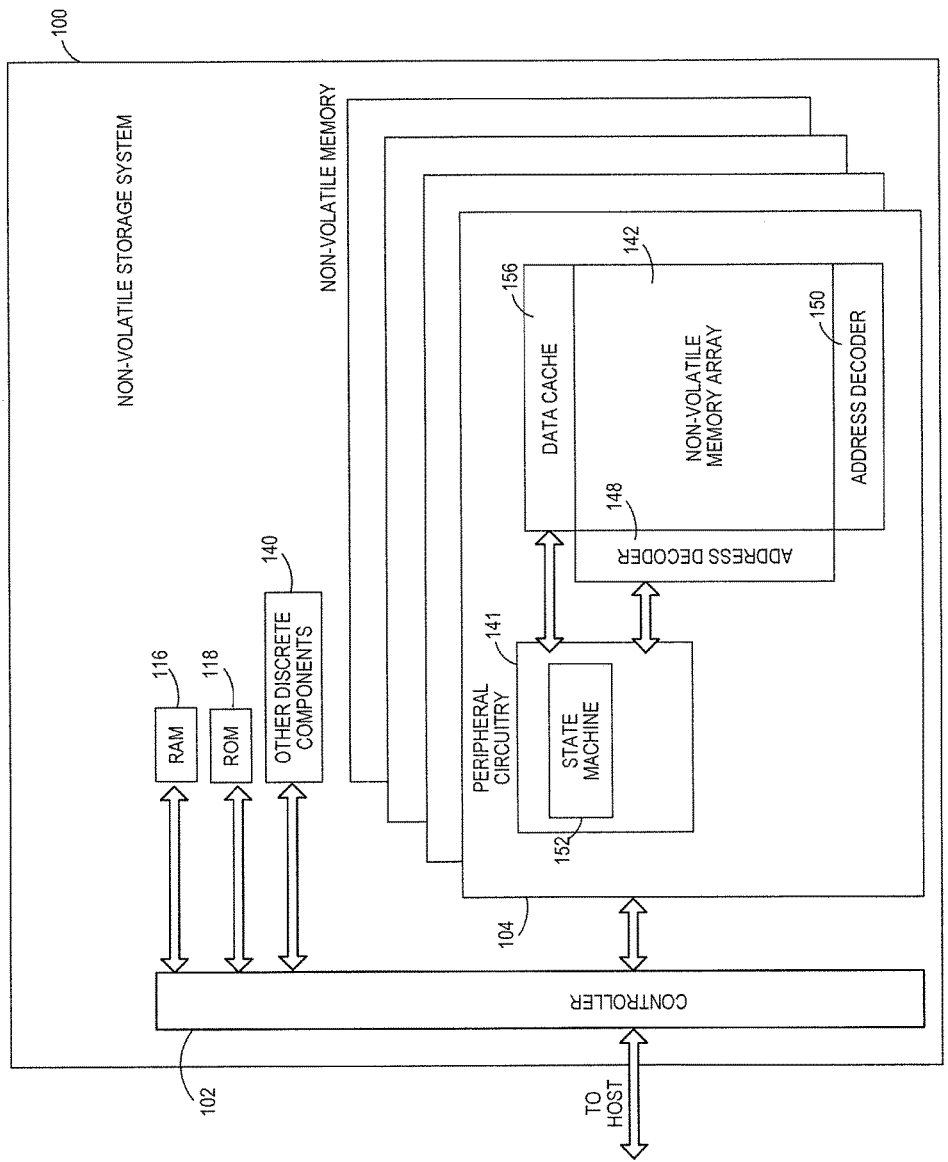
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Figure 3:
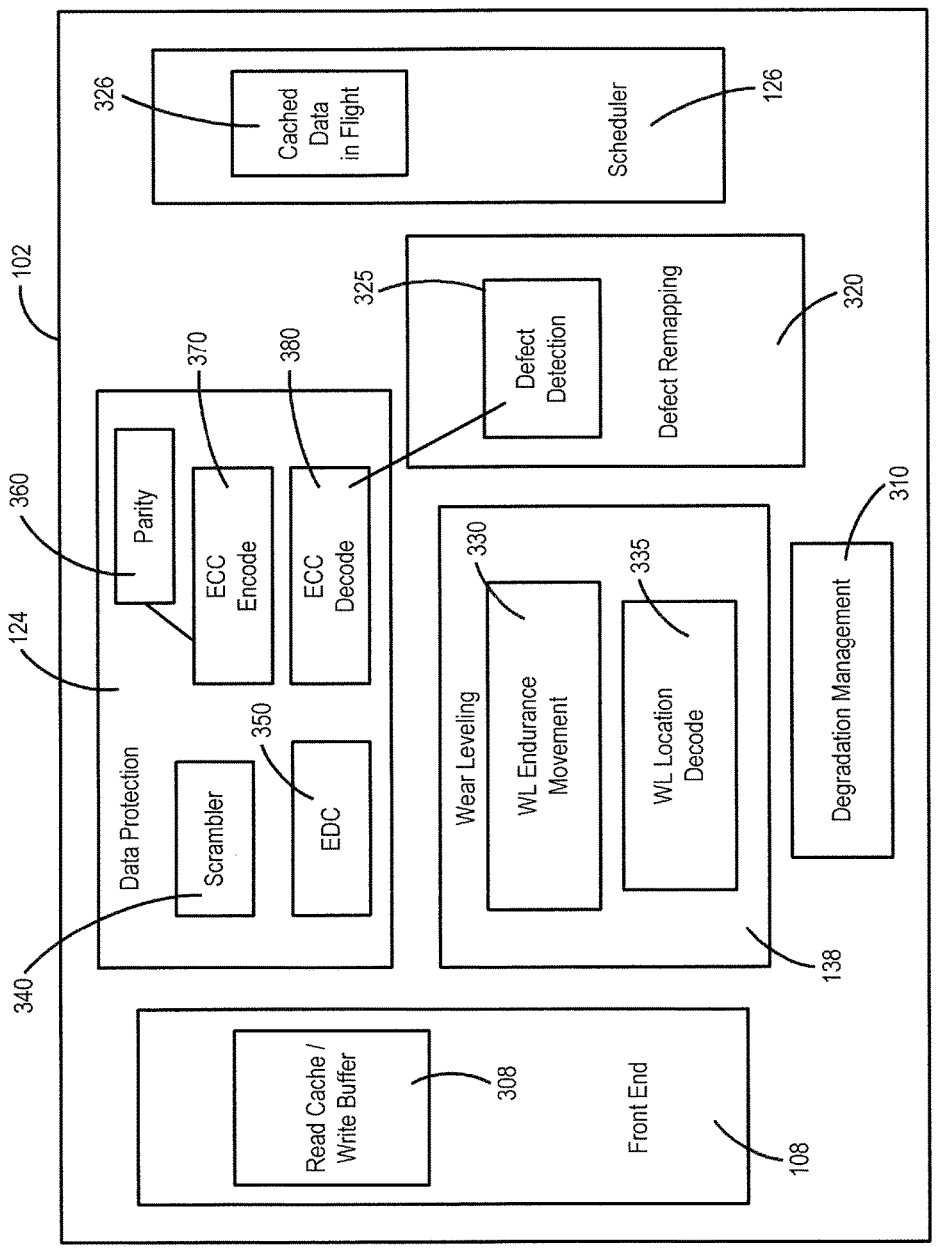
FIG. 3 is block diagram of a controller of an embodiment.

FIG. 3 is an illustration of one particular implementation of a controller 102 an embodiment. This controller 102 can be used, for example, when the memory 104 comprises a persistent memory, which is sometimes referred to as as storage class memory or a program-in-place memory ("program in place" refers to the fact that block management of the memory is not needed). In general, such memories are a form of non-volatile memory that are faster than flash and can be used as a replacement for DRAM to keep data temporarily ruggedized. Examples of such memories, include, but are not limited to, resistive random access memory (ReRam), phase-change memory (PCM) and magnetoresistive random-access memory (MRAM). It should be noted that this is just an example, and other implementations can be used. For example, a controller that works with NAND or other forms of non-volatile memory can be used. Also, while some components of the controller 102 from earlier drawing are shown in FIG. 3, others are not to simplify the drawing.

As shown in FIG. 3, the controller 102 in this embodiment comprises a front end module 108 with a read cache/write buffer 308 for storing data sent from/to the host using an ordered command FIFO. The controller 102 also comprises a scheduler (sequencer) 126 that schedules read and write operations to the memory 103 and is used for command prioritization and execution and data/location coherence. The controller 102 further comprises a cache 326 for data in flight between the controller 102 and the memory 104. In this embodiment, the media management layer 138 includes a wear leveling feature. In this particular embodiment, the wear leveling algorithm is implemented in hardware, although, in other embodiments, it can be implemented in firmware/software. Also, in other embodiments, other or different type of media management layers can be used, such as, but not limited to, garbage collection. Further, the degradation module 310 can implement various algorithms to manage the degradation of the memory cells in the memory 104 (e.g., read/program disturbs, neighbor disturbs, and data retention issues from age or heat).

In this embodiment, the wear leveling module 138 comprises a wear leveling endurance movement module 330 and a wear leveling location decode module 335. In operation, the controller 102 received data and a logical address received from the host. The wear leveling endurance movement module 330 contains counters tracking how many times different memory regions (e.g., pages or blocks) have been written to. The wear leveling endurance movement module 330 can choose a memory region to store the data based on the values of the counters, to make sure that all of the memory regions are being used as equally as possible, so no one memory region wears out before the others from use. The physical address of the chosen region is stored in the wear leveling decode module 335, which contains a data structure (e.g., a table, or algorithm with supporting metadata) that associates the logical address from the write command with the physical address used to store the data. That way, when the controller 102 later receives a read command and logical address from the host to read the data, the wear leveling decode module 335 can look up the physical address associated with the logical address, read the from the physical address in memory 104, and send the data to the host (after temporarily storing the data in the caches 326, 308 as the data moves through the controller 102).

The controller 102 also comprises a data protection module 124 comprising a data scrambler (or randomizer) 340, an error detection code (EDC) engine 350, an error correction code (ECC) encoder 370, and an ECC decoder 380. In operation, the data protection module 124 can be used to process the data being read/written for data protection purposes. For example, after getting data to be written from the write buffer 308, the scrambler 340 can scramble the sequence of bits in the data, and then the EDC engine 310 can generate an error detection code. The error detection code and the data are then used by the ECC engine 370 to generate ECC parity bits 360. The data, error detection code, and ECC parity bits 360 are then stored in the memory 104. When the data is later read, the ECC decoder 380 decodes the data and corrects any correctable error. If an error occurs due to a memory defect (e.g., a grown defect), a defect remapping module 320 detects the error with a defect detection module 325, marks the block as bad, and maps the bad block to a good block. All ECC algorithms have a possibility of having the bits in error exceed their correction capability. If the correction capability of the ECC algorithm is exceeded, the ECC algorithm has a small but non-zero chance of thinking it succeeded in correcting the data. The ECC algorithm will then report "corrected", and an EDC code is used to confirm that there is not a silent error. If the EDC fails, it will not be able to correct it. However, this is preferable to returning the data and not knowing it was wrong. If the data does not contain an error or contains an error that was corrected, the data is sent to the scrambler module 340 to descramble the data, and then the data is sent the read cache 308, where it is then sent to the host.

In this embodiment, the storage system 100 uses data protection information to protect data from errors that can occur when the data is stored in the memory 104 ("data at rest," as opposed to protection information that protects data "in flight" from the host to the storage system 100). As used herein, "data protection information" can refer to information stored with the data that can be used in the process of detecting and/or correcting an error in the data. Examples of data protection information include, but are not limited to, error correction code ("ECC") information and/or error detection code ("EDC") information. The data protection information and the data from the host can form a code word that is stored in the memory 104.

Figure 4:
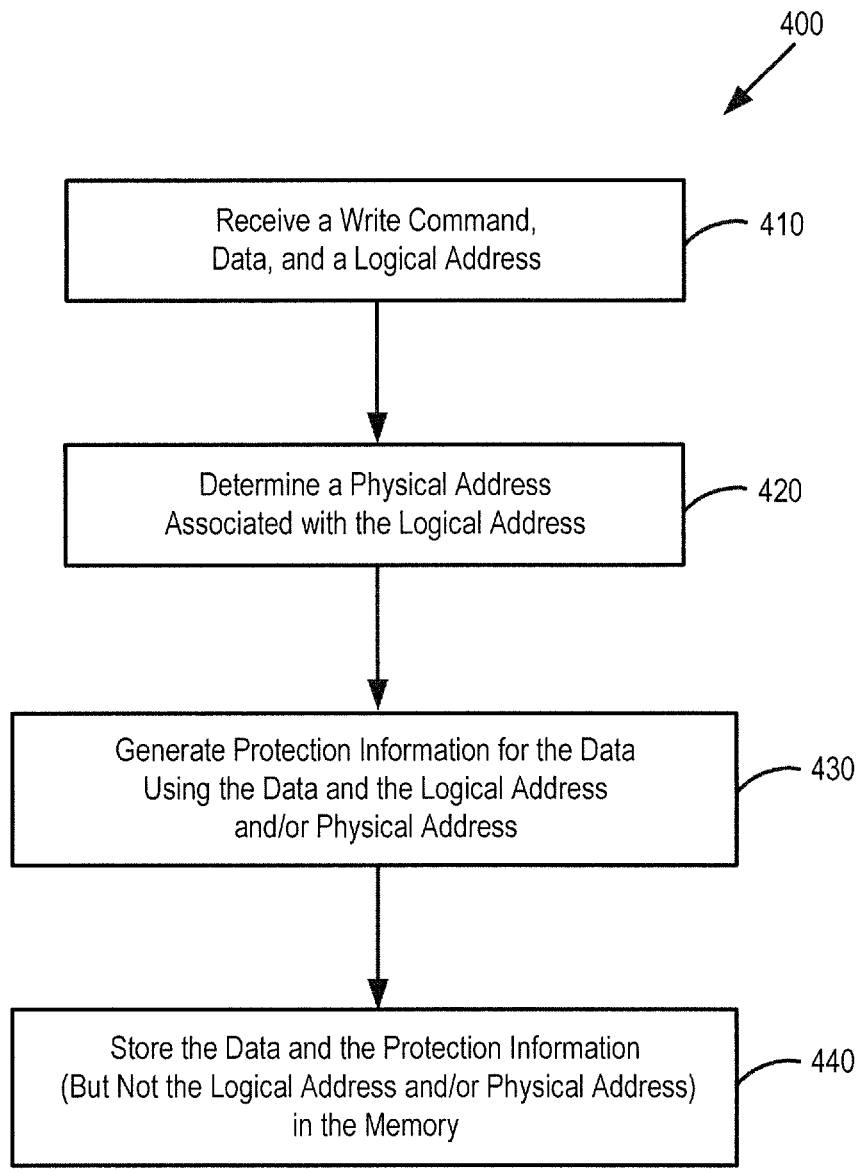
FIG. 4 is a flow chart of a write flow method of an embodiment for improving data protection efficiency.

Returning to the drawings, FIG. 4 is a flow chart 400 of a method of an embodiment for writing a code word. The method can be implemented in the controller 102 (e.g., the one in FIG. 3 or another implementation) or other component of the storage system 100. As shown in FIG. 4, the controller 102 receives a write command, data, and a logical address from a host or other device (act 410). Next, the controller 102 determines a physical address associated with the logical address (act 420). The controller 102 can make this determination in any suitable way. For example, in the embodiment shown in FIG. 3, the wear leveling module 138, which is implemented in hardware and contains a data structure mapping logical addresses to physical addresses, can be used. Other implementations are possible. For example, while the wear leveling module 138 was implemented in hardware in FIG. 3, it could instead be implemented in firmware/software. Further, instead of the logical-to-physical address map being stored in the wear leveling module 138, it can be stored in another location in the controller 102, such as, for example, a garbage collection module or simply in memory. It should be noted that many wear leveling algorithms do not store the logical-to-physical address map. Instead, they do the translation through an equation or algorithm, where a small number of pointers and counters can describe a large set of addresses (e.g., the whole drive or a large subset of the drive). Accordingly, in one embodiment, the wear leveling algorithm can calculate the present physical address/location of each logical address through formulas and metadata information that describes a large quantity of positions with a reduced quantity of information.

Next, the controller 102 generates protection information (e.g., an error detection code and/or an error correction code) for the data using the data and at least one of the logical address and physical address (act 430). How the protection information is generated can depend on the type of data protection scheme that is used by the controller 102. Several examples on how the protection information can be generated are provided below. Then, the controller 102 stores the data and the protection information, but not the logical address and/or physical address used to generate the protection information, in the memory 104 (act 440). The significance of the absence of the logical address and/or physical address in the code word written to memory 104 will be discussed below.

As noted above, some prior storage systems store the logical block address along with data and the protection information, in case the logical block address is needed to debug the logical-to-physical address map (e.g., if there is an error in one or more entries in the map due to an entry being out of date with the status of the media 104). That is, if the wrong physical address is associated with the logical address in the map, the map cannot be used to file the data belonging to the logical address. However, if the logical address is stored with the data, all of the data and associated logical addresses can be read from memory in order to correct or reconstruct the map.

Figure 5:
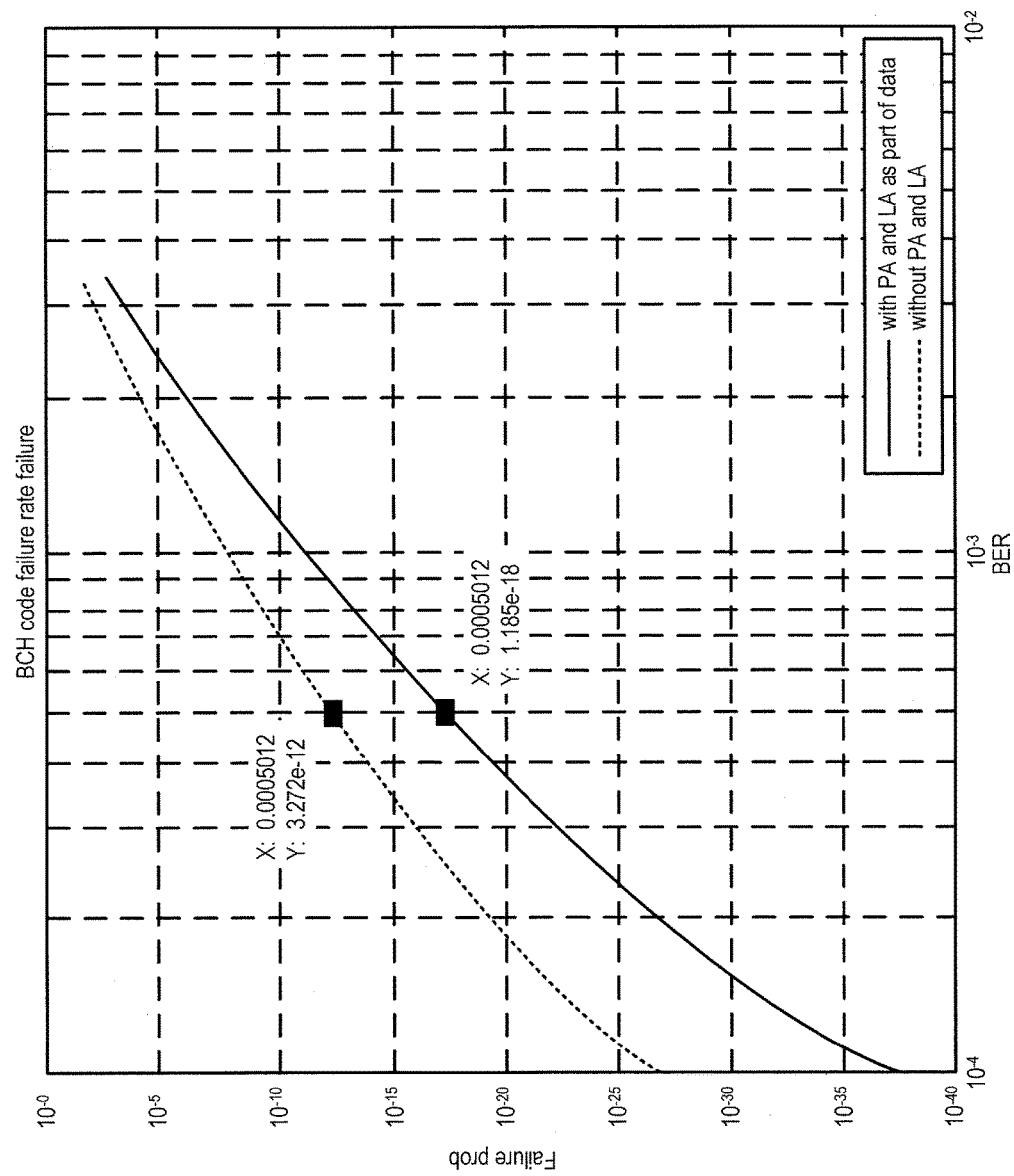
FIG. 5 is a graph of an embodiment showing failure probability versus bit error rate.

In this embodiment, because the logical address and/or physical address used to generate the protection information is not written in the memory 104, for the same code word block size as before, there will be more space for parity, and a stronger code can be utilized. This is illustrated in FIG. 5, which is a graph showing failure probability versus bit error rate of an example. The plots on this graph compare the performance of the codes when (256+32)B code words are used. When both logical address and physical address are part of the code word, for 256 B of user data, 20 bytes will be available for parity. BCH code uses 156 bits with resulting correction capability of 13 bits. On the other hand, under the embodiment where neither logical address nor physical address is saved on the media 104, 28 bytes are available for parity. BCH code uses 216 bits and results a code with 18 bits of correction capability. As an example, in typical ReRAM with a BER point of 5e-4, this embodiment decreases the sector failure rate (SFR) from 3.2e-12 to 1.2e-18. This improvement in SFR directly improves the uncorrectable bit error rate (UBER); in this example, more than five orders of magnitude. At the same time, miscorrection rate (silent errors) can be improved more than five orders of magnitude as a direct impact of better ECC (due to the extra space provided, which can be used to hold additional error correction bits). As such, ECC and EDC efficiency improvements can be used for improved cost, correction capabilities (e.g., improved drive UBER), or miscorrection detection capabilities.

The tradeoff of not storing the logical address in the memory 104 is that the code word will not contain the logical address to debug or reconstruct a logical-to-physical address map. However, there may not be that great of a need, if any, for such debugging/reconstructing if the storage system 100 can provide a robust enough logical-to-physical address map (i.e., if the accuracy of the mapping of logical to physical addresses is above some threshold). In addition, the generated physical address will be further checked in ECC decoding, as the physical address and logical address are part of the codeword to generate the ECC in this embodiment. Therefore, if there is inaccuracy in logical-to-physical mapping, the ECC will detect it with high probability. For example, in the embodiment shown in FIG. 3, the map is created by a wear leveling algorithm that is implemented in hardware. (As noted above, while FIG. 3 shows the hardware implemented a wear leveling algorithm, other algorhims (e.g., garbage collection) that map data storage can be used.) A hardware implementation allows the wear leveling algorithm to be verified and validated like all other application-specific integrated circuit (ASIC) functions in a hardware-implemented ASIC controller. After verification and validation, the results of the wear leveling algorithm hardware can be depended upon. For example, the controller 102 can be subjected to an input-output address verification test, which looks to see whether there is a one-to-one correspondance between logical addresses and physical addresses (i.e., that each logical address maps to a single physical address and each physical address maps to a single logical address). If the controller 102 passes this test with a certain degree of accuracy (e.g., 100% or some number less than 100%), the controller 102 can be deemed reliable enought that a logical address does not need to be stored with the data for debugging purposes.

It should be noted that a hardware implementation of the mapping functionality is not required by these embodiments. For example, if the mapping is performed in firmware (e.g., such as when a NAND drive uses data movement algorithms tracked and implemented in firmware), and the verification and validation states of the firmware are sufficient enough to make decoding of logical to physical addresses dependable (e.g., above some reliability threshold), the firmware may be deemed reliable enough to rely on without the need of storing the logical address for debugging purposes.

As mentioned above, how the protection information is generated can depend on the type of data protection scheme used by the controller 102. The following paragraphs provide several examples of how the protection information can be generated. It should be noted that these are just examples, and other techniques can be used. These examples take advantage of the fact that with a reliable mapping system (e.g., a hardware implementation of a wear leveling or other mapping algorithm, a sufficiently-reliable firmware implementation, etc.), the storage system 100 can have one or two pieces of information (the logical addresss and/or physical address) at its disposal for stornger error detection code (EDC) efficiency, in addtion to extra protection resulted from stronger ECC due to a larger number of parity bits. Improved EDC and ECC can result in lower media storage overhead (cost) and/or improved misdetection capability for the same size EDC In the below examples, the protection information comprises both EDC and ECC and uses both logical addresses and physical addresses in generating the protection information. However, it should be noted that these are just examples and that other variations can be used (e.g., EDC without ECC, or vice versa; using the logical address but not the physical address, or vice versa, etc.).

Figure 6:
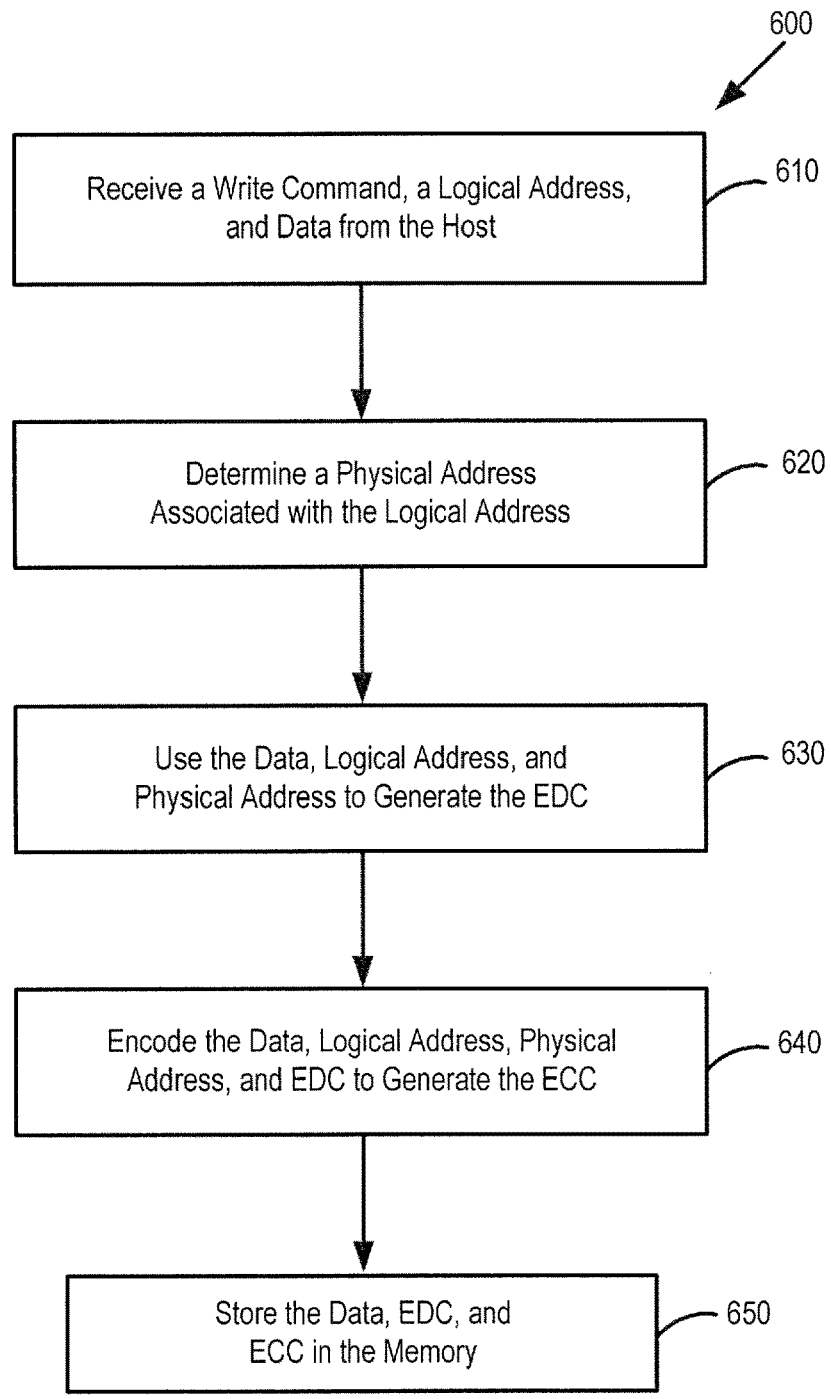
FIG. 6 is a flow chart of a write flow of an embodiment that uses systematic error correction code.
Figure 7A:
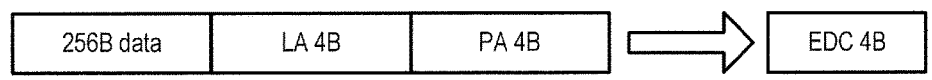
FIGS. 7A, 7B, and 7C are illustrations of code words illustrating the write flow in FIG. 6.
Figure 7B:
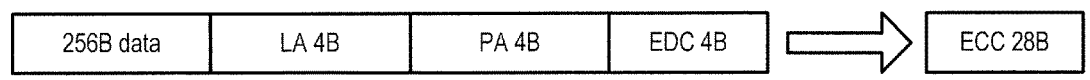
Figure 7C:
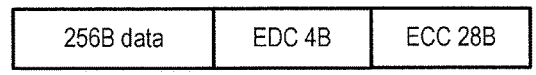

FIGS. 6-9 illustrate a write flow example in which systematic ECC is used. In general, systematic ECC is an error correcting code technique that generates ECC encoding information without altering the input data, and non-systematic ECC is an error correcting code technique where the ECC encoding and generating process incorporates both the input data and the bits for protection together such that the input data is no longer clearly identifiable. (Examples of systematic ECC include, but are not limited to, BCH, RS, and LDPC.) The ECC decode process can be used to remove the effects of the ECC and again visibly identify the input data clearly. Turning first to FIG. 6, FIG. 6 is a flow chart 600 of a write flow of an embodiment, and FIGS. 7A, 7B, and 7C are illustrations of code words that will be used to illustrate this flow. In this example, the storage system 100 generates error detection code (EDC) using the write data and at least one of the logical address and physical address, and the storage system 100 generates error correction code (ECC) using the data, the at least one of the logical address and physical address, and the error detection code.

It should be noted that EDC can be generated several ways, and some EDC protection schemes do not take up storage space on the media, such as when using Reed Solomon encoding with constraints on the check matrix holding a known value. In this situation, the EDC is used to generate the ECC (i.e., the ECC has EDC constraints), but the EDC is not stored in the media. During the ECC decode, the byproduct serves as EDC. As shown in FIG. 6, the storage system 100 (e.g., the controller 102 or some other component) receives a write command, a logical address, and data from the host (e.g., through the controller's front end module 108 (see FIG. 3)) (act 610). Next, the storage system 100 determines a physical address associated with the logical address (e.g., using the controller's wear leveling module 138) to program the data (act 620). Then, the controller 102 uses the data, logical address, and physical address to generate the EDC (act 630). This is shown diagramatically in FIG. 7A. The storage system 100 then encodes the data, logical address, physical address, and EDC to generate the ECC (act 640). This is shown diagramatically in FIG. 7B. Finally, the storage system 100 stores the data, EDC, and ECC in the memory 104 (act 650). This is shown diagramatically in FIG. 7C. Note that, in this example, the logical address and physical address are discarded out of the RAM in the controller 102 and not stored in memory 104, allowing for more space for parity and a stronger code.

Figure 8:
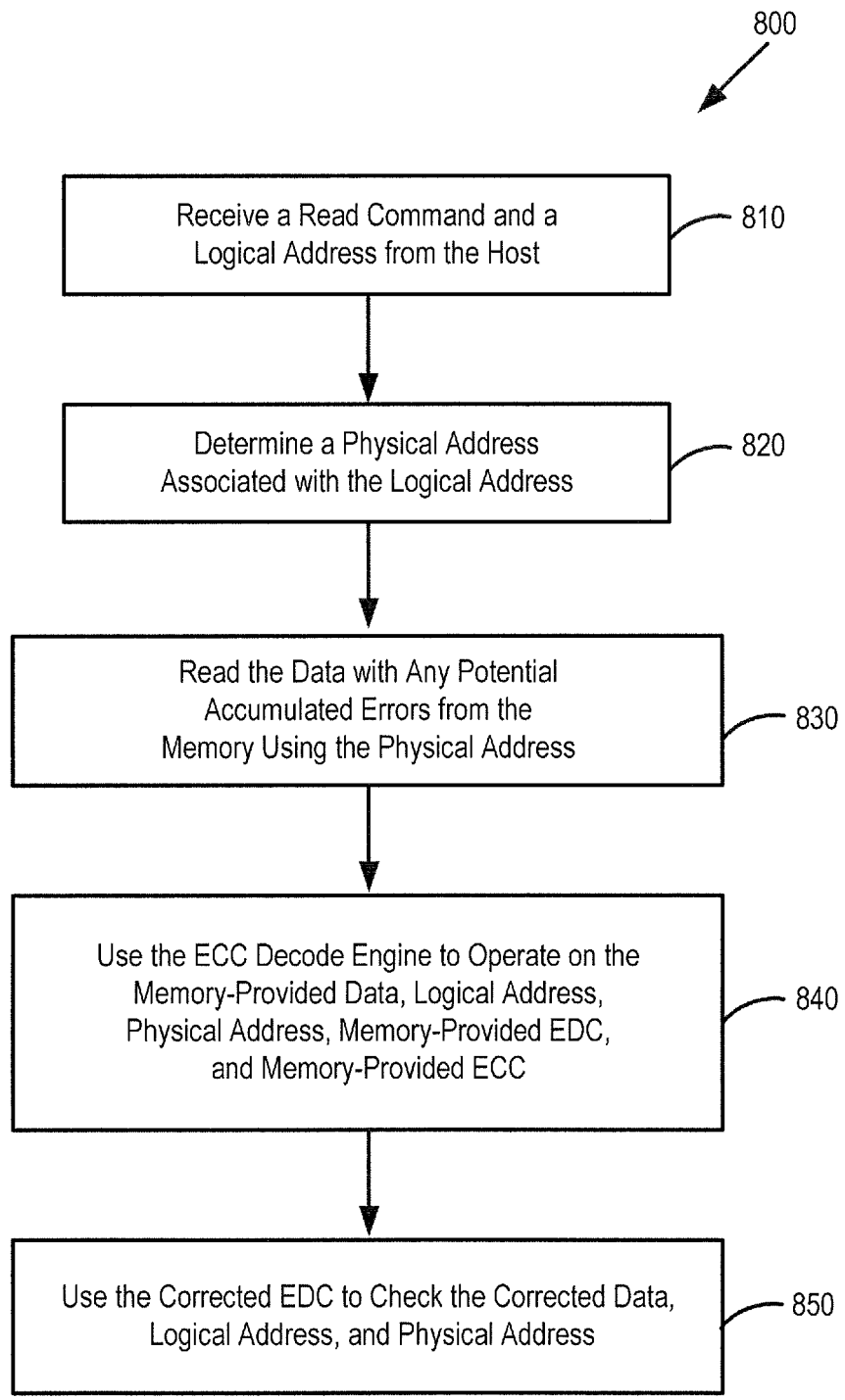
FIG. 8 is a flow chart of a read flow of an embodiment that uses systematic error correction code.
Figure 9A:
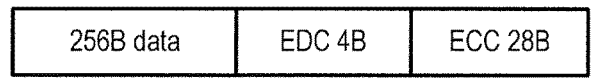
FIGS. 9A, 9B, and 9C are illustrations of code words illustrating the read flow in FIG. 8.
Figure 9B:
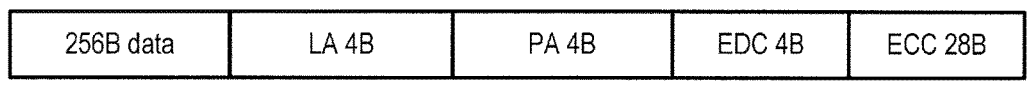
Figure 9C:

Turning now to FIGS. 8 and 9, FIG. 8 is a flow chart 800 of a read flow of an embodiment, and FIGS. 9A, 9B, and 9C are illustrations of code words that will be used to illustrate this flow. As shown in FIG. 8, the storage system 100 receives a read command and a logical address from the host (e.g., through the controller's front end module 108 (see FIG. 3)) (act 810). Next, the storage system 100 determines a physical address associated with the logical address (e.g., using the controller's wear leveling module 138) (act 820). The storage system 100 then reads the code word having the data, EDC, and ECC with any potential accumulated errors from the memory using the physical address (act 830). This is shown diagramatically in FIG. 9A. Then, the storage system 100 uses the ECC decode engine in the contorller 102 to operate on the memory-provided data, logical address, physical address, memory-provided EDC, and memory-provided ECC (act 840). This is shown diagramatically in FIG. 9B. Finally, the storage system 100 uses the corrected EDC to check the corrected data, logical address, and physical address (act 850). This is shown diagramatically in FIG. 9C.

Figure 10:
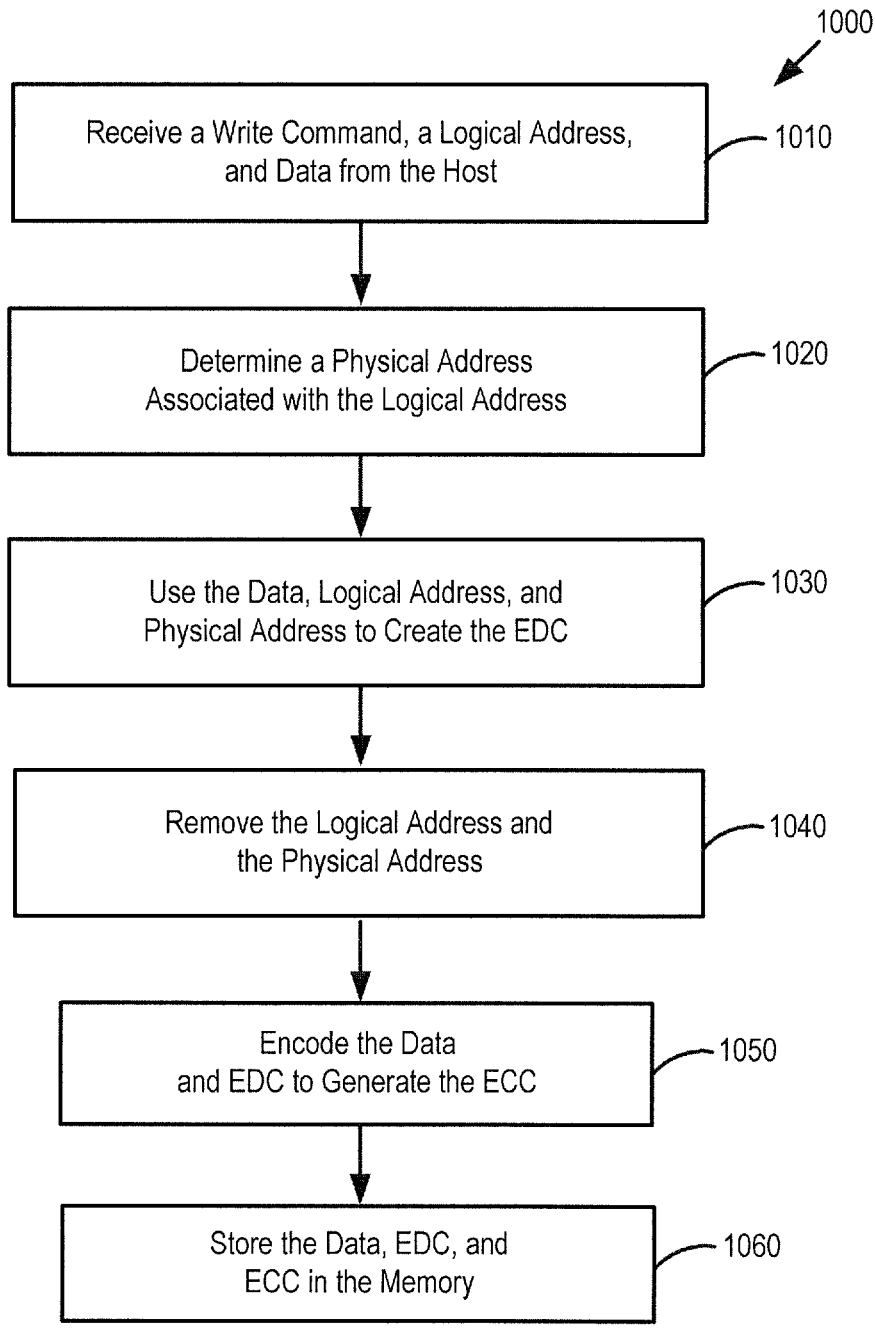
FIG. 10 is a flow chart of a write flow of an embodiment that uses non-systematic error correction code.
Figure 11:
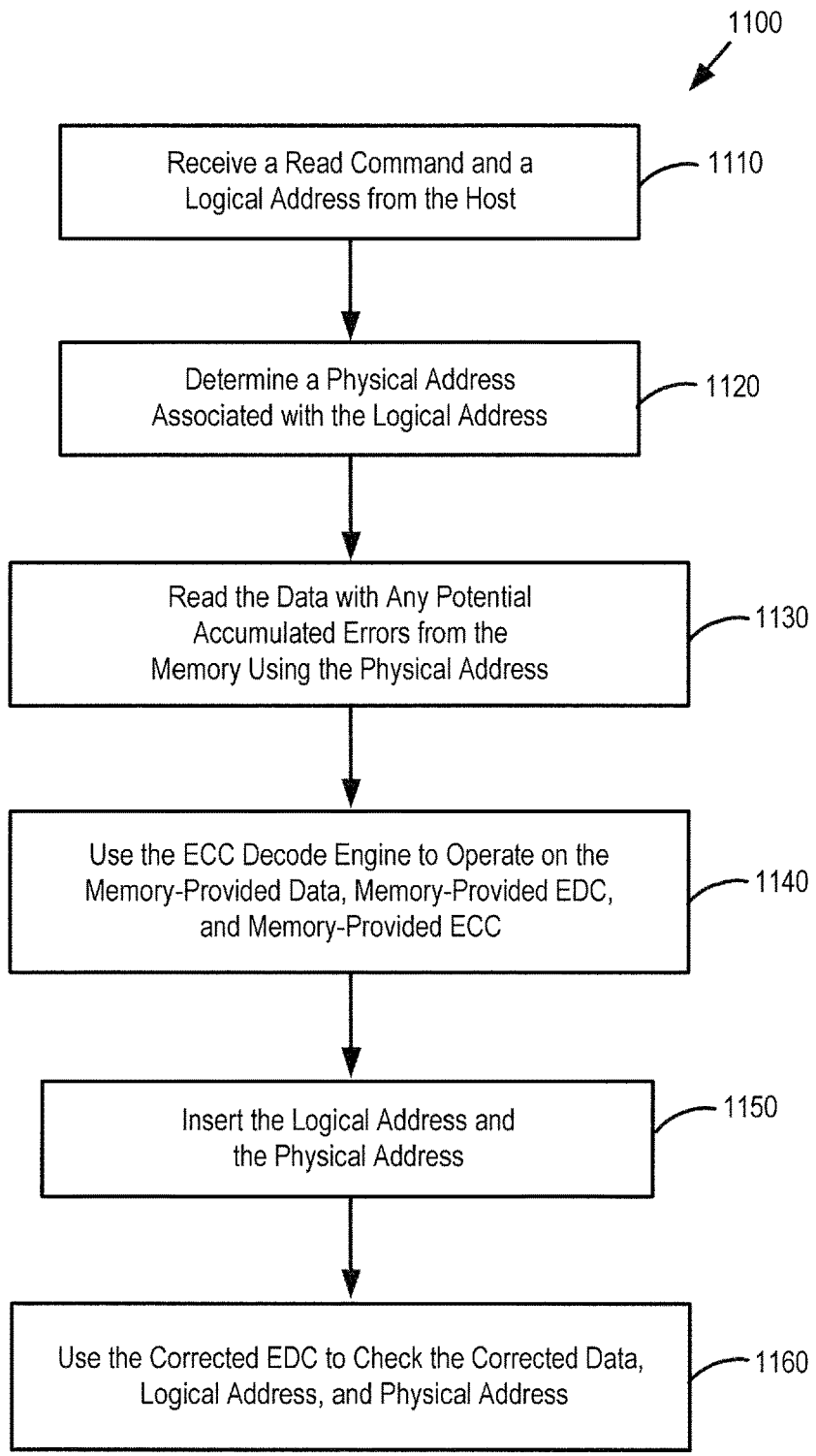
FIG. 11 is a flow chart of a read flow of an embodiment that uses non-systematic error correction code.

As mentioned above, the prior two examples assumed a systematic ECC. The flow charts 1000, 1100 in FIGS. 10 and 11 illustrate write and read flows when a non-systematic ECC is used. Turning first to the write flow in FIG. 10, acts 1010-1030 and 1060 are similar to acts 610-630 and 650 in FIG. 6. However, because the logical and physical addresses are not used to generate non-systematic ECC, in this embodiment, the logical and physical addresses are removed (act 1040), and the ECC is generated without them (act 1050). Similarly, in the read flow, acts 1110-1130 and 1160 are similar to acts 810-830 and 850 in FIG. 8. However, because the logical and physical addresses are not used to generate non-systematic ECC, in this embodiment, the ECC decoding process does not use the logical and physical addresses (act 1140) is generated without them. The logical and physical addresses are later added in (act 1150).

There are many alternatives that can be used with these embodiments. For example, when RAID is used, the write flow can be: {(data1,EDC1,ECC1) (data2,EDC2,ECC2), outer ECC} where outer ECC can be RAID or other ECC protection. As another example, the storage system 100 can be configured to generate new protection information when the storage system 100 changes the physical location of the data (e.g., in response to a garbage collection operation). Such a change may be needed if the physical address was used to create protection information. This alternative will now be discussed in conjunction with the flow chart 1200 in FIG. 12.

Figure 12:
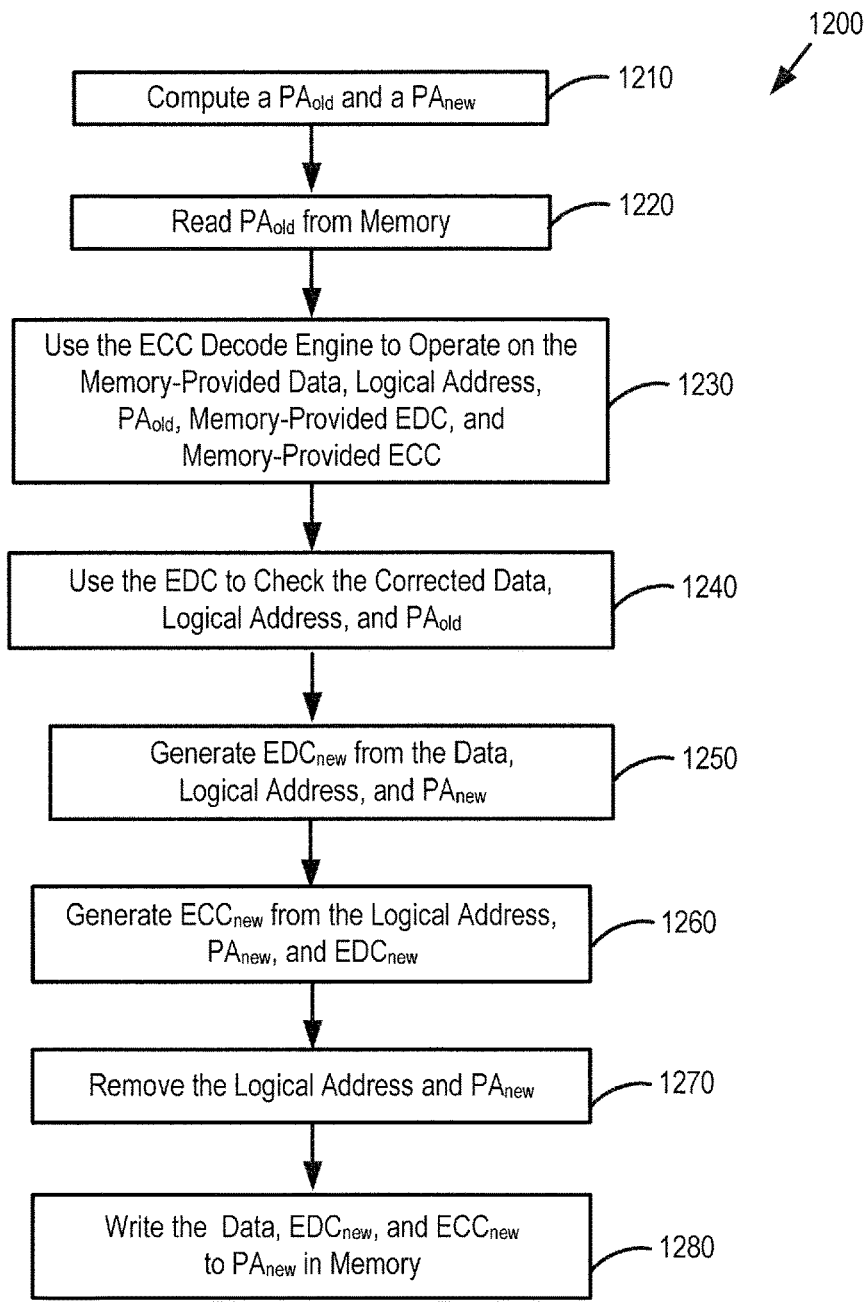
FIG. 12 is a flow chart of a method of an embodiment for regenerating data protection information when data is moved.

As shown in FIG. 12, when the mapping algorithm in the storage system 100 recognizes data movement for a given logical address, the storage system 100 computes an old physical address ($PA_{old}$) that currently stores the data and a new physical address ($PA_{new}$) of where the data will reside (act 1210). Next, the storage system 100 reads the data stored in $PA_{old}$ in memory 104 (act 1220). Then, the storage system 100 uses the ECC decode engine in the controller 102 to operate on the data, logical address, $PA_{old}$, EDC, and ECC (act 1230). Next, the storage system 100 uses the EDC to check the corrected data, logical address, and $PA_{old}$ (act 1240). The storage system 100 then generates a new error detection code ($EDC_{new}$) from the data, logical address, and $PA_{new}$ (act 1250). The storage system 100 then generates new error correction code ($ECC_{new}$) from the logical address, $PA_{new}$, and $EDC_{new}$ (act 1260). Finally, the storage system 100 removes the logical address and $PA_{new}$ (act 1270) and writes the data, $EDC_{new}$, and $ECC_{new}$ to $PA_{new}$ in the memory 104 (act 1280).

The above example assumed that the physical address was used in creating the ECC (e.g., systematic ECC). If the physical address is not used in creating the ECC (e.g., non-systematic ECC), the decoding and re-encoding of the data can be optional. For example, it may not be desired unless the storage system 100 decides that the bit error accumulation rate is such that a correction is desired prior to media re-write in the new location.

It should be noted that the algorithms shown in the flow charts and described herein can be implemented in any suitable controller. For example, the algorithms can be implemented in a controller for persistent memories (e.g., ReRam, PCM, and MRAM) with a wear levling and/or garbage collection algorithm implementation. As another example, the algorithms can be implemented in a controller for NAND memories. As noted above, NAND typically chooses to place the logical address in the memory to catch logical-to-physical address mapping bugs. In this case, the logical address space savings on the media may not be realized due to the system choice. The physical address may be available if the controller is presently programing or reading from that exact physical address location. The advantages of these embodiments may be realized for EDC efficiency improvements. ECC improvements may be realized if the ECC scheme is of a systematic variety where the logical address and physical address may be inserted without degrading decode correctness (as explained above, systematic ECC schemes encode the data and ECC without altering the data that is being encoded).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode or transistor circuitry, etc.

Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a memory; and
a controller in communication with the memory, wherein the controller is configured to:
receive a write command, data, and a logical address;
determine a physical address associated with the logical address;

generate protection information for the data using the data, the logical address, and physical address; and store the data and the protection information in the memory without storing the logical address and physical address in the memory.

2. The storage system of claim 1, wherein the protection information comprises at least one of an error detection code and an error correction code.

3. The storage system of claim 1, wherein the protection information comprises both an error detection code and an error correction code, and wherein the controller is configured to:

generate the error detection code using the data, the logical address, and physical address; and generate the error correction code using the data, the, logical address, the physical address, and the error detection code.

4. The storage system of claim 1, wherein the protection information comprises both an error detection code and an error correction code, and wherein the controller is configured to:

generate the error detection code using the data, the logical address, and physical address; and generate the error correction code using the data and the error detection code but not the, logical address or the physical address.

5. The storage system of claim 1, wherein the controller is further configured to:

receive a read command and the logical address;

determine the physical address associated with the logical address;

read the data and the protection information from the physical address in the memory; and process the protection information.

6. The storage system of claim 1, wherein the controller is further configured to generate new protection information and store the data and the new protection information in the memory in response to the storage system moving the data from the physical address to a new physical address.

7. The storage system of claim 1, wherein the controller is further configured to map logical addresses to physical addresses such that each logical address maps to a single physical address and each physical address maps to a single logical address.

8. The storage system of claim 1, wherein the controller is further configured to map logical addresses to physical addresses, wherein an accuracy of the mapping is above a threshold.

9. The storage system of claim 1, wherein the memory comprises a three-dimensional memory.

10. The storage system of claim 1, wherein the storage system is embedded in the host.

11. The storage system of claim 1, wherein the storage system is removably connected to the host.

12. A method for writing a code word to memory, the method comprising:

performing the following in a storage system comprising a memory:

creating a logical address to physical address map;

creating error detection code using data, a logical address, and a physical address associated with the logical address;

creating error correction code using the data and the error detection code; and writing, based on a determined accuracy of the logical address to physical address map, a code word comprising the data, error detection code, and error correction code in the memory, wherein the code word is free of the logical address and the physical address.

13. The method of claim 12, wherein the error correction code comprises systematic error correction code, and wherein the error correction code is further generated using the logical address and the physical address.

14. The method of claim 12, wherein the error correction code comprises non-systematic error correction code, and wherein the error correction code is generated without using the logical address and the physical address.

15. The method of claim 12, wherein the accuracy of the mapping is above a threshold.

16. The method of claim 12, wherein the memory comprises a three-dimensional memory.

17. The method of claim 12, wherein the storage system is embedded in a host.

18. The method of claim 12, wherein the storage system is removably connected to a host.

19. A storage system comprising:

a memory;

means for receiving a write command, data, and a logical address;

means for generating a logical address to physical address map;

means for generating protection information for the data using the logical address and a corresponding physical address; and means for storing, based on a determined accuracy of the logical to physical address map, the data and the protection information in the memory without storing the logical address or the corresponding physical address.

20. The storage system of claim 19, wherein the memory comprises a three-dimensional memory.

* * * * *